United States Patent [19]

Schettler

[11] Patent Number: 5,572,640
[45] Date of Patent: Nov. 5, 1996

[54] BATCH TRANSFER SYSTEM AND METHOD FOR HIGH PERFORMANCE GRAPHIC DISPLAY OF NETWORK TOPOLOGY

[75] Inventor: Robert D. Schettler, Fort Collins, Colo.

[73] Assignee: Hewlett-Packard Company, Palo Alto, Calif.

[21] Appl. No.: 347,914

[22] Filed: Dec. 1, 1994

[51] Int. Cl.⁶ .................................................. G06F 15/62
[52] U.S. Cl. ............................................................. 395/140
[58] Field of Search ................................... 395/140, 141, 395/155, 161; 345/113, 118

[56] References Cited

U.S. PATENT DOCUMENTS 5,185,860  2/1993  Wu ........................................... 395/200
5,276,789  1/1994  Besaw et al. ............................ 395/140

Primary Examiner—Phu K. Nguyen

[57] ABSTRACT

Discovery/layout software configures a general purpose computer system to act as a management station using the industry standard SNMP protocol. The discovery/layout software has a discovery mechanism and a layout mechanism which, in combination, permit the discovery/layout software to provide various submaps on demand to a display. The submaps are directed to various hierarchical views of the network. The discovery mechanism monitors and discovers the device configuration on the network and maintains a topology data base indicative thereof. A layout mechanism has a translator which converts the topology data from the topology data base to map data, which is maintained in a map data base. Significantly, topology data is received by the translator in a batch and, in addition, map data is transferred from he translator in a batch.

20 Claims, 16 Drawing Sheets

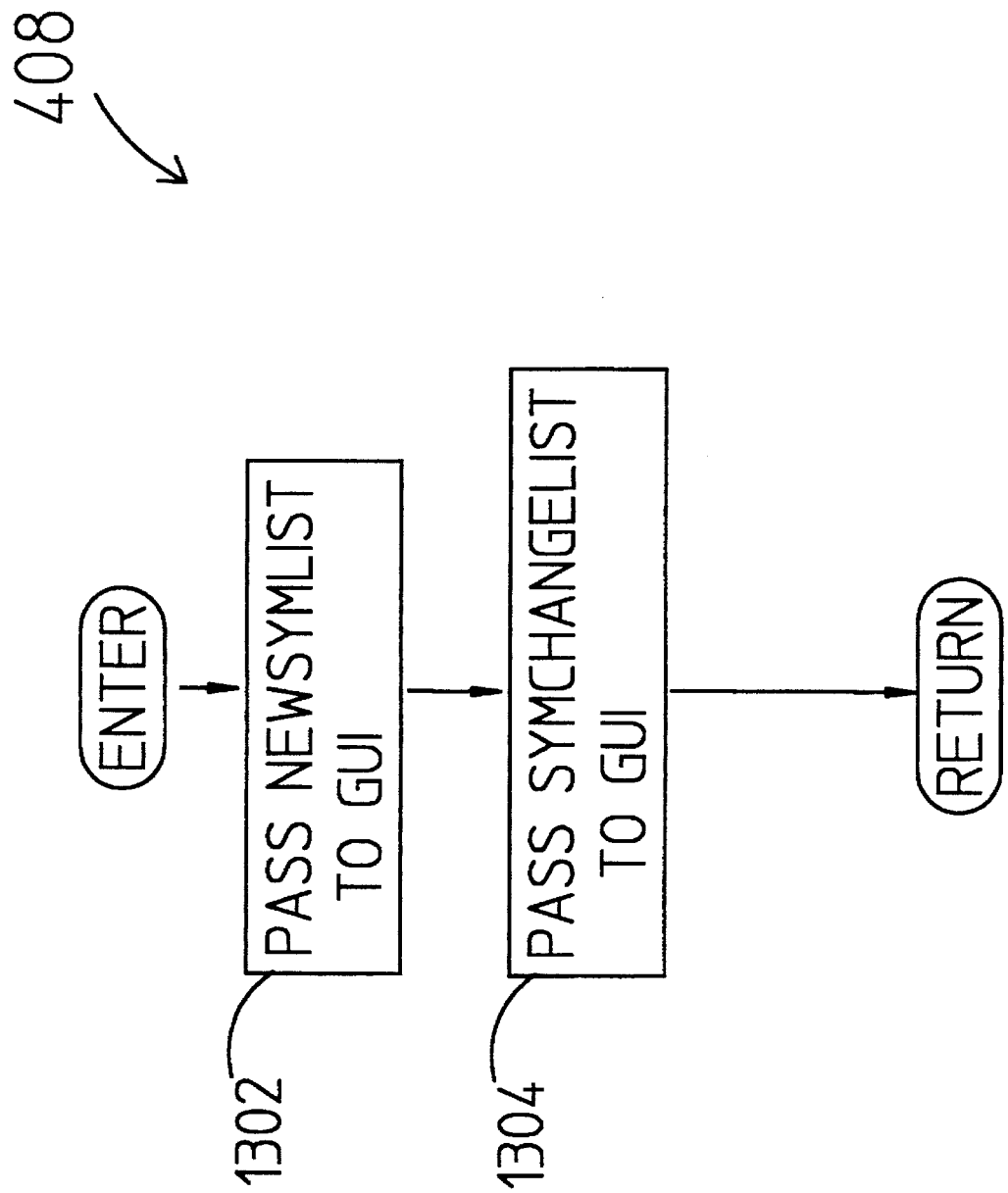

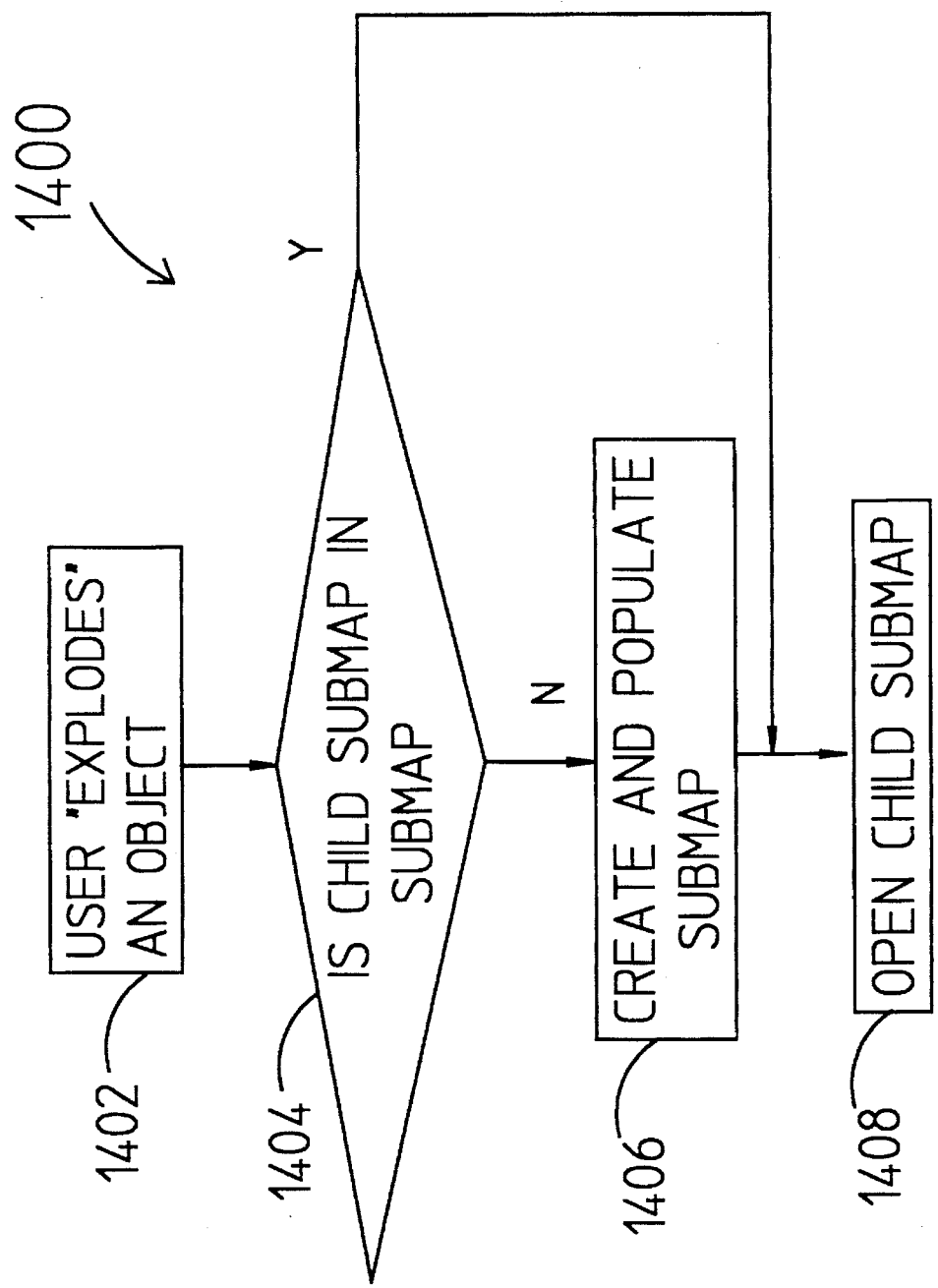

BATCH TRANSFER SYSTEM AND METHOD FOR HIGH PERFORMANCE GRAPHIC DISPLAY OF NETWORK TOPOLOGY

FIELD OF THE INVENTION

The present invention relates to data communications and networks, and more particularly, to a batch transfer system and method for high performance graphic display of network topology, or the devices and associated interconnections of a network.

BACKGROUND OF THE INVENTION

A data communications network generally includes a group of devices, for instance, computers, repeaters, bridges, routers, etc., situated at network nodes and a collection of communication channels for interconnecting the various nodes. Hardware and software associated with the network and particularly the devices permit the devices to exchange data electronically via the communication channels.

The size of networks varies. A local area network (LAN) is a network of devices in close proximity, typically less than one mile, and usually connected by a single cable, for instance, a coaxial cable. A wide area network (WAN) is a network of devices which are separated by longer distances, often connected by, for example, telephone lines or satellite links. In fact, some WANs span the U.S. as well as the world. Furthermore, many of these networks are widely available for use by the public, including commonly universities and commercial industries.

A very popular industry standard protocol for data communication along the networks is the Internet Protocol (IP). This protocol was originally developed by the U.S. government's Department of Defense, and has been dedicated for public use by the U.S. government. In time, the Transmission Control Protocol (TCP) and the Unreliable Datagram Protocol (UDP) were developed for use with the IP. The former protocol (TCP/IP) is a protocol which guarantees transfer of data without errors, as it implements certain check functionality, and the latter protocol (UDP/IP) is a protocol which does not guarantee transfer of data, but requires much less overhead than the TCP/IP platform. Furthermore, in order to keep track of and manage the various devices situated on a network, the Simple Network Management Protocol (SNMP) was eventually developed for use with a UDP/IP platform. The use of the foregoing protocols has become extensive in the industry, and numerous vendors now manufacture many types of network devices which can employ these protocols.

Many management software packages ("management platforms") are presently available for implementing "management stations" on a network, and particularly, in connection with the SNMP. Examples of commercially available SNMP management software packages include OpenView from the Hewlett-Packard Company (the assignee herein), NetView/6000 from IBM Corp., Spectrum from Cabletron Systems, Inc., NetLabs/Manager from NetLabs, Inc., and SunNet Manager from SunConnect, Inc. The nodes on a network and their interconnections, oftentimes referred to as the network "topology," are best displayed in a graphical format, and most, if not all, of the available management software packages provide for this feature. Typically, with these packages, a network can be viewed from different vantage points, depending on the scope of the view desired. For example, one view of the network could be a very wide encompassing view of all nodes on the entire network. A second view could be a view of those portions of a network within a local range, for example, within a particular site or building. A third view of a network, often called a segment, could be a view of the nodes attached to a particular LAN cable.

Hewlett-Packard's very successful OpenView has been the subject of several patents, including for instance, U.S. Pat. No. 5,185,860 issued to J. C. Wu on Feb. 9, 1993, and U.S. Pat. No. 5,276,789 issued to Besaw et al. on Jan. 4, 1994, the disclosures of which are incorporated herein by reference. U.S. Pat. No. 5,185,860 describes an automatic discovery system for a management station for determining the network devices and interconnections of a network, or the topology. U.S. Pat. No. 5,276,789 describes a graphic display system for a management station for graphically displaying the topology of a network and provides for various views (including, internet, segment, and node views) that can be requested by a user.

Although the presently available SNMP management stations are meritorious to an extent, the art of SNMP management stations is still in a state of infancy and the performance of these management stations can still be enhanced and optimized. Specifically, the requisite time and speed for obtaining topology data, for converting topology data to display map data, and for driving a display with the display map data remain less than optimal and could still stand for improvement in terms of minimizing these parameters.

SUMMARY OF TEE INVENTION

An object of the present invention is to overcome the inadequacies and deficiencies of the prior art as noted above and as generally known in the industry.

Another object of the present invention is to provide a system and method for enhancing the speed and performance of a management station for a network.

Another object of the present invention is to provide a system and method for enhancing the speed and performance of processes for obtaining topology data, for converting topology data to display map data, and for driving a display with the display map data in a management station of a network.

Another object of the present invention is to provide a system and method for enhancing the speed and performance of a management station which utilizes the SNMP and/or IP.

Briefly described, the present invention is a batch transfer system and method for a management station or other device of a network for enhancing the speed at which map data for a display is generated from topology data pertaining devices and device interconnections of the network. The system comprises a processor which executes the various software elements of the system, a discovery mechanism for determining the network topology data, and a layout mechanism for converting the network topology data to map data and for driving a display with the map data.

More specifically, the discovery mechanism has a network monitor configured to monitor and determine the topology of the network, a topology database for storing the topology data, and a topology manager for managing the topology database. The network monitor is also configured to generate topology change events when a change in network topology occurs and also to receive such events from other devices connected to the network.

The layout mechanism is in communication with the discovery mechanism. The layout mechanism has a translator, a graphical user interface (GUI), and a map database. The translator is configured to convert the topology data to the map data, to receive the events, and to change the map data based upon the events. The graphical user interface is configured to receive the map data from the translator, to manage the topology data in the topology database, and to drive the display based upon the map data.

In accordance with the batch transfer feature of the present invention, batch transfers of topology data occur from the topology manager to the translator and/or batch transfers of map data occur from the translator to the GUI. These batch transfers minimize context switching (changeover of control of the processor as well as the operating system) in the management station, which significantly enhances the speed and performance of the same.

In addition to achieving all of the aforementioned objects, the present invention has numerous other advantages, a few of which are enumerated hereafter.

An advantage of the present invention is that the batch transfer system is simple in design and easily implemented on a mass commercial scale.

Another advantage of the present invention is that the batch transfer system is efficient as well as reliable in operation.

Another advantage of the present invention is that the principles of the batch transfer system and method can be applied not only to management stations, but also to other devices, including devices which do not practice the SNMP. For example, the batch transfer system and method could be applied to a network router for enhancing the performance thereof.

Other objects, features, and advantages of the present invention will become apparent to one of skill in the art upon examination of the following drawings and detailed description. All such additional objects, features, and advantages are intended to be included herein.

BRIEF DESCRIPTION OF THE DRAWINGS

The present invention can be better understood with reference to the following drawings and should be considered in the context of the accompanying text.

FIG. 13 is a flow chart illustrating the architecture of an update map block of FIG. 4; and FIG. 14 is a flow chart illustrating the architecture of an on-demand submap block within the graphical user interface (GUI) of FIG. 2.

DETAILED DESCRIPTION OF THE PREFERRED EMBODIMENT

The following description is of the best presently contemplated mode of carrying out the present invention. This description is not to be taken in a limiting sense, but is made merely for the purpose of describing the general principles of the invention. The scope of the invention should be determined by referencing the appended claims.

Figure 1:
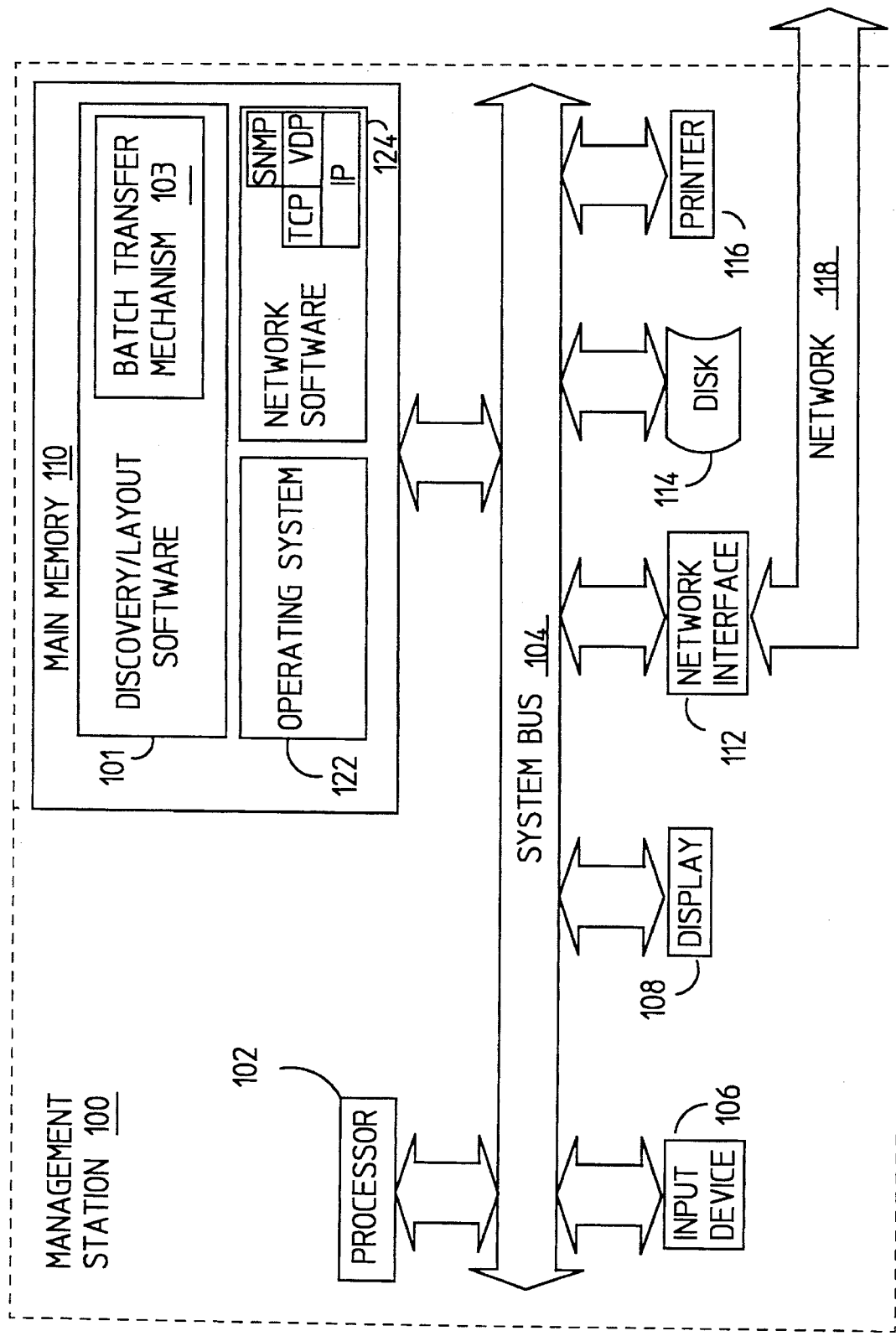
FIG. 1 is a block diagram of a management station having discovery/layout software which employs the batch transfer system and method of the present invention.

FIG. 1 shows a block diagram of an object-oriented management station 100 which is implemented with a general purpose computer system containing novel discovery/layout software 101, which employs a batch transfer mechanism 103 and associated methodology in accordance with the present invention. With reference to FIG. 1, the management station 100 contains a conventional processor 102. The processor 102 communicates to other elements within the management station 100 over a system bus 104. An input device 106, for example, a keyboard or mouse, is used to input data from a user of the system 100, and a display 108 is used to output data to the user. A network interface 112 is used to interface the management station 100 to a network 118 in order to allow the management station 100 to act as a node on a network 118. A disk 114 may be used to store the software of the discovery/layout software 101 of the present invention, as well as to store the data bases (topology and map) generated by the discovery/layout software 101. A printer 116 can be used to provide a hard copy output of the nodes of the network 118 discovered by the discovery/layout software 101. A main memory 110 within the management station 100 contains the discovery/layout software 101. The discovery/layout software 101 communicates with a conventional operating system 122 and conventional network software 124 to discover the nodes on the network 118. The network software 124 serves as the intelligence, including validation, for the data communication protocols. As shown in FIG. 1, in the preferred embodiment, the network software implements the IP, the TCP and UDP over the IP, and the SNMP over the UDP. All of the foregoing protocols are well known in the art.

The discovery/layout software 101 implements object-oriented functionality. In the context of SNMP managers, object-oriented means that most of the management system actions and processes that the user can invoke are oriented toward a class of devices rather than individually managed network nodes.

Figure 2:
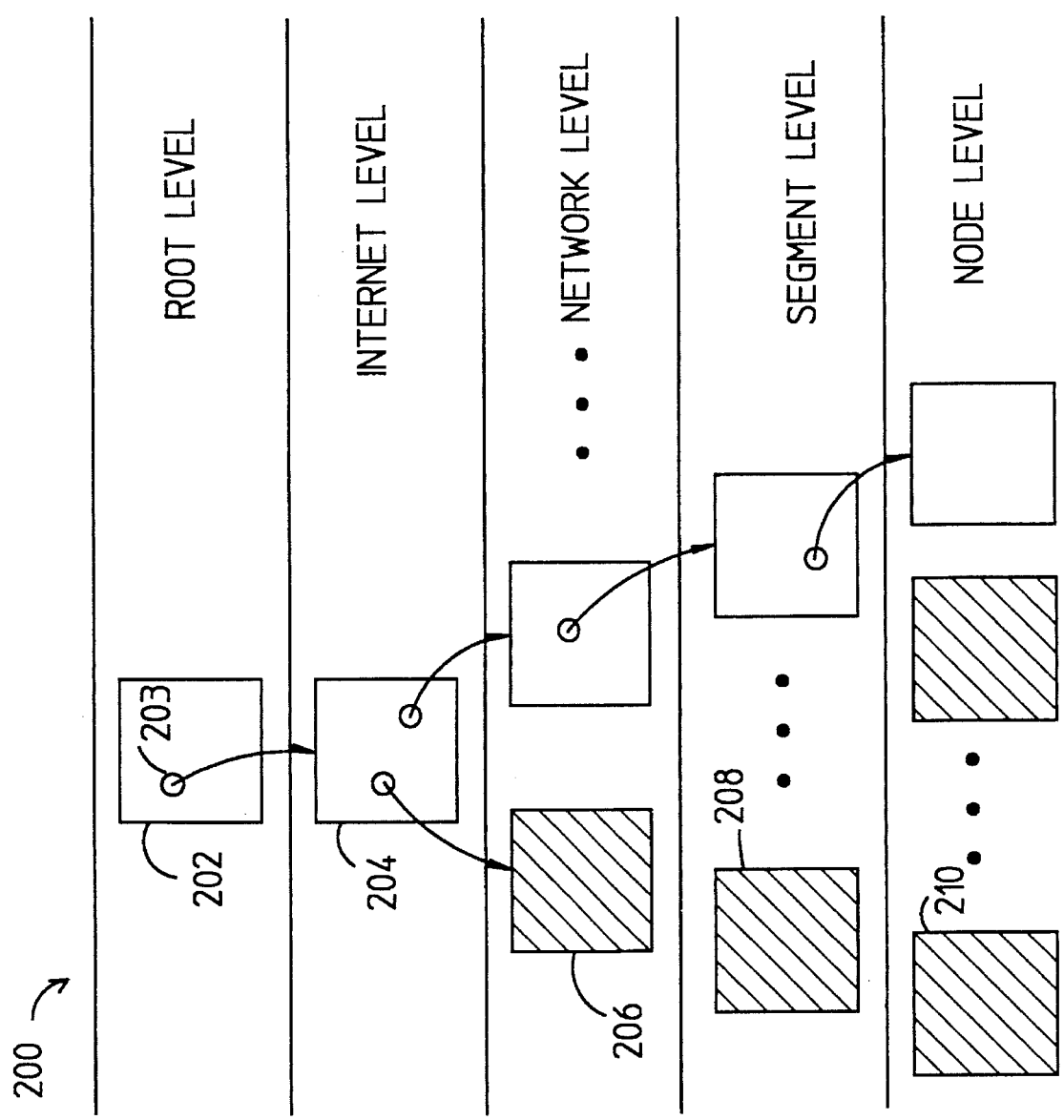
FIG. 2 is a schematic diagram illustrating a display map, which comprises a collection of submaps, any of which can be displayed on the display of the management station by the discovery/layout software of FIG. 1.

Generally, the discovery/layout software 101 of FIG. 1 is configured to discover the network topology, that is, all network nodes and node interconnections existing on the network 118, and to construct a map, comprising various submaps, any of which can be used for displaying the network topology on the display 108. FIG. 2 shows a map 200 which is generated by the discovery/layout software 101 from topology data discovered from the network 118. The discovery/layout software 101 can drive any of the various submaps to the display 108 (FIG. 1) for viewing by the user.

The submaps in the map 200 of FIG. 2 are arranged in a hierarchy. A root submap 202 is defined at a root level. The root submap 202 represents the highest logical level submap in the hierarchy and shows objects 203 acting as anchor points for different submap hierarchies. Each hierarchy is a separate management domain. This could be, for instance, a network, logical grouping of nodes, or some other domain. An internet submap 204 is defined at an internet level and is generated by "exploding" an object 203 within the root submap 202. "Exploding" in the context of this document means that the user prompts the management station 100 with the input device 106 to break down and provide more data pertaining to the object 203 at issue. Further, the internet submap 204 illustrates objects 203 in the form of networks and routers. Any one of a number of network submaps 206 can be exploded from the internet submap 204. Each network submap 206 shows objects 203 in the form of segments and connectors. Any one of a number of segment submaps 208 can be exploded from an object 203 within a network submap 206. Each segment submap 208 shows objects in the form of network nodes. Finally, any one of a number of node submaps 210 can be exploded from an object 203 within a segment submap 208. Each node submap 210 shows objects 203 in the form of interfaces within that node.

In the preferred embodiment, although not necessary to practice the present invention, the discovery/layout software 101 implements on-demand submaps in order to save memory and processing time. The concept of on-demand submaps is to only place those submaps in the map 200 of FIG. 2 which the user wants to see. The net result is that only a portion of the submap hierarchy is in the map 200 at a given time. In FIG. 2, submaps (nonresident) which are not present, but would be created upon prompting by the user, are indicated by hatching. The resident submap subset of the hierarchy will change over time as the user traverses the submap hierarchy and causes nonresident submaps to be created.

Figure 3:
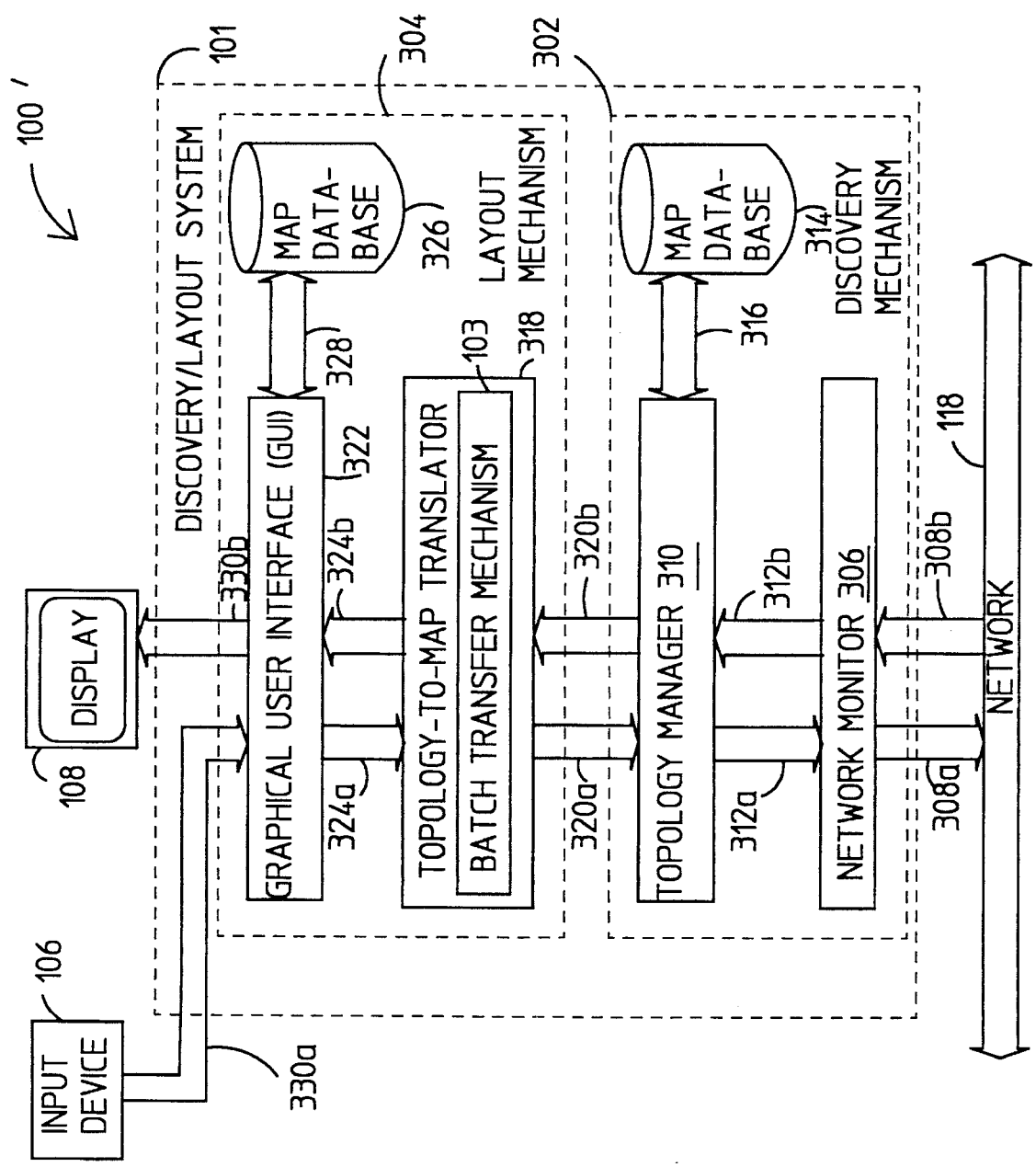
FIG. 3 is a block diagram of the discovery/layout software and batch transfer system of FIG. 1.

A high level block diagram of the discovery/layout software 101 (FIG. 1) is set forth in FIG. 3. With the exception of the batch transfer mechanism 103, the architecture of the discovery/layout software 101 of FIG. 3 is essentially the same as or similar to that in Hewlett-Packard's well known and commercially available management software package called OpenView. As shown in FIG. 3, at a general architecture level, the discovery/layout software 101 comprises a discovery mechanism 302 for discovering nodes and interconnections of the network 118 and a layout mechanism 304 for receiving topology data from the discovery mechanism 302 and for generating the map 200 (FIG. 2) for driving the display 108.

The discovery mechanism 302 has a network monitor 306 connected to the network 118 as indicated by connections 308a, 308b, a topology manager 310 connected to the network monitor 306 as indicated by arrows 312a, 312b, and a topology data base in communication with the topology manager 310 as indicated by arrow 316.

The network monitor 306 transmits and receives data packets to and from the network 118. The network monitor 306 discovers and monitors network topology, as indicated by arrows 308a, 308b. When network topology changes on the network, the network monitor 306 generates events, or traps (SNMP vernacular), which include an object identifier and object change information. The network monitor 306 can also receive events from other devices, such as a router, in the network 118. The network monitor 306 interacts with the network 118 by way of the network software 124 (FIG. 1), which essentially comprises protocol stacks, corresponding to IP, TCP, UDP, and SNMP in the preferred embodiment, and which generally implements these protocols and performs validation functions. Furthermore, the network monitor 306 populates the topology data base 314 by way of the topology manager 310 and notifies the topology manager 310 of events (topology changes). Finally, it should be noted that U.S. Pat. No. 5,185,860 to Wu, which is incorporated herein by reference, describes a node discovery system which could be employed to implement the network monitor 306 herein.

The topology manager 310 manages the topology data base 314, as indicated by bidirectional arrow 316. The topology manager 310 prompts the network monitor 306 to update topology data related to particular events, as indicated by arrow 312a, and receives topology updates, as indicated by arrow 312b.

The topology data base 314 stores topology data based upon objects, which are used to partition the network for logical reasons. Objects include, for example but not limited to, a network, a segment, a computer, a router, a repeater, a bridge, etc. Moreover, the topology data stored with respect to the objects includes, for example but not limited to, an interface or device address, an interface or device type, an interface or device manufacturer, and whether an interface or device supports the SNMP.

The layout mechanism 304 has a topology-to-map translator 318 in communication with the topology manager 310 as indicated by arrows 320a, 320b, a graphical user interface (GUI) 322 in communication with the topology-to-map translator 318 as indicated by arrows 324a, 324b, and a map data base 326 in communication with the GUI 322 as indicated by bidirectional arrow 328. It should be noted that the network monitor 306, the topology manager 310, the translator 318, and the GUI 322 take turns utilizing the combination of the operating system 122 (FIG. 1) and the processor 102 (FIG. 1) in order to accomplish there respective functions. A "context switch" as used herein refers to a change in control of the system 122 and/or processor 102 by the foregoing software elements.

The translator 318 converts topology data from the topology data base 314 to map data and constructs the various submaps 202–210 in the map 200 of FIG. 2. The translator 318 can forward a request to the topology manager 310, as indicated by arrow 320a, in order to obtain topology data regarding particular objects. Moreover, in addition to forwarding topology data to the translator 318 upon request, the topology manager 310 advises the translator 318, as indicated by the arrow 320b, when topology data has changed based upon an event so that the translator 318 can make any appropriate changes in the submaps.

The GUI 322 manages the map data base 326, as indicated by the bidirectional arrow 328, and manages the display 108 and input device 106, as indicated by the arrows 330a, 330b. The GUI 322 receives map updates from the translator 318, as indicated by arrow 324b, and submits user-triggered events to the translator 318, as indicated by arrow 324a. A user-triggered event includes a prompt 330a from a user to explode an object, as described relative to FIG. 2. Finally, it should be noted that U.S. Pat. No. 5,276,789 to Besaw et al., which is incorporated herein by reference, describes a graphical user interface which could be employed to implement the GUI 322 herein.

Figure 4:
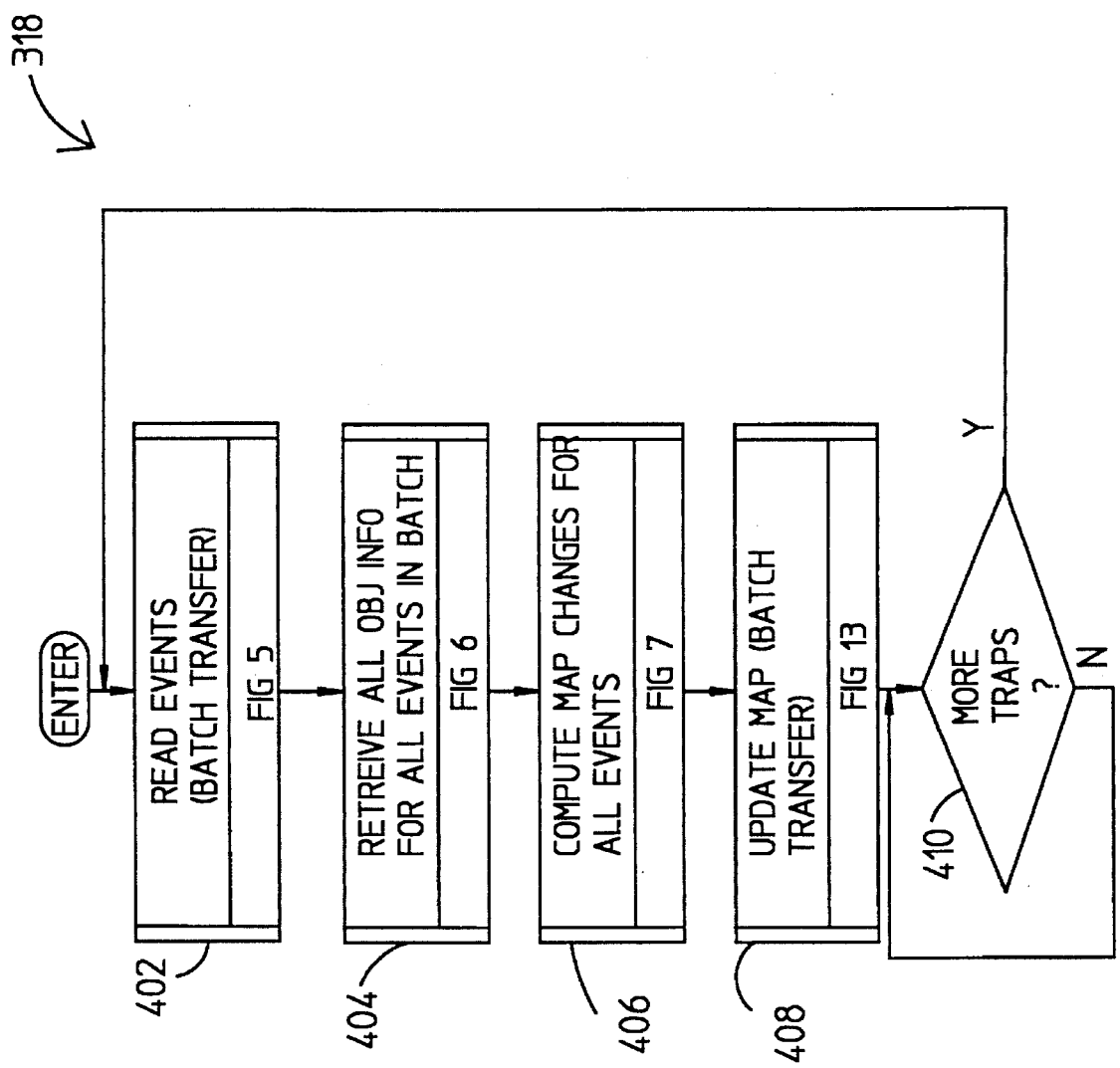
FIG. 4 is a flow chart illustrating the architecture of the topology-to-map translator of FIG. 3.

FIG. 4 shows a flow chart 400 indicating the architecture and functionality of the preferred embodiment of the topology-to-map translator 318 (FIG. 3). The translator employs the batch transfer mechanism 103 and associated methodology in accordance with the present invention, which minimize context switches (changes in the control of the operating system 122 and/or processor 102) and significantly enhance the speed and performance of the discover/layout software 101.

With reference to FIG. 4, initially, events are queued and accumulated in a queue (not shown), or accumulator, associated with the topology manager 310, and await retrieval by the translator 318. In accordance with a significant feature of the present invention, the translator 318 reads a batch of events from the topology manager 310 during each access. Each event contains an object identifier and an object change. Moreover, the batch is any number of events greater than one. In the tested embodiment, the batch was limited to a number no greater than 500 events, but other settings, either less than or greater than (perhaps significantly) this number could be utilized, depending upon the configuration of the system. It should be further noted that in Hewlett-Packard's management software package known as OpenView, events are read from the topology manager 310 by the translator 318 one at a time during each access.

Next, as indicated in block 404, the translator 318 calls the topology manager 310 for a list of topology data regarding all objects which were identified in the events. After receiving the topology data, block 404 transfers to block 406.

At block 406, the translator 318 computes the changes to be made to the map data, particularly the map 200 (FIG. 2), based upon the topology data changes indicated in the events. Block 406 transfers to block 408.

At block 408, the translator 318 updates the map 200 (FIG. 2) by calling the GUI 322 and advising the GUI 322 of all submap changes (SYMCHANGELIST and NEWSYMLIST described hereinafter) pertaining to all object changes. Significantly, this transaction is also a batch transfer. During this batch transfer transaction, the translator 318 identifies each submap to be changed, each object to be changed within a submap, and the particular change to be effectuated to the object. An object change may include, for example but not limited to, a color, position, or connection change. Block 408 transfers to block 410. It should be further noted that in Hewlett-Packard's management software package known as OpenView, events are transferred from the translator 318 to the GUI 322 one at a time during each access.

At block 410, the translator 318 determines whether there is another batch of events to be read from the topology manager 310. If so, then block 410 transfers to block 402 and the previously described process is repeated. If not, then the software waits at block 410 for another batch of events.

Because of the preferred embodiment of the translator 318 set forth in FIG. 4, topology data pertaining to various objects is retrieved in a batch from the topology manager 310 and, furthermore, map data pertaining to various submaps is transferred in a batch from the translator 318 to the GUI 322. The foregoing implementation minimizes context switches, i.e., minimizes the number of times that control of the processor 102 (FIG. 1) and/or the operating system 122 (FIG. 1) is passed from one software module to another. This operation significantly enhances the performance of the discovery/layout software 101 and results in better than an order of magnitude increase in performance.

Figure 5:
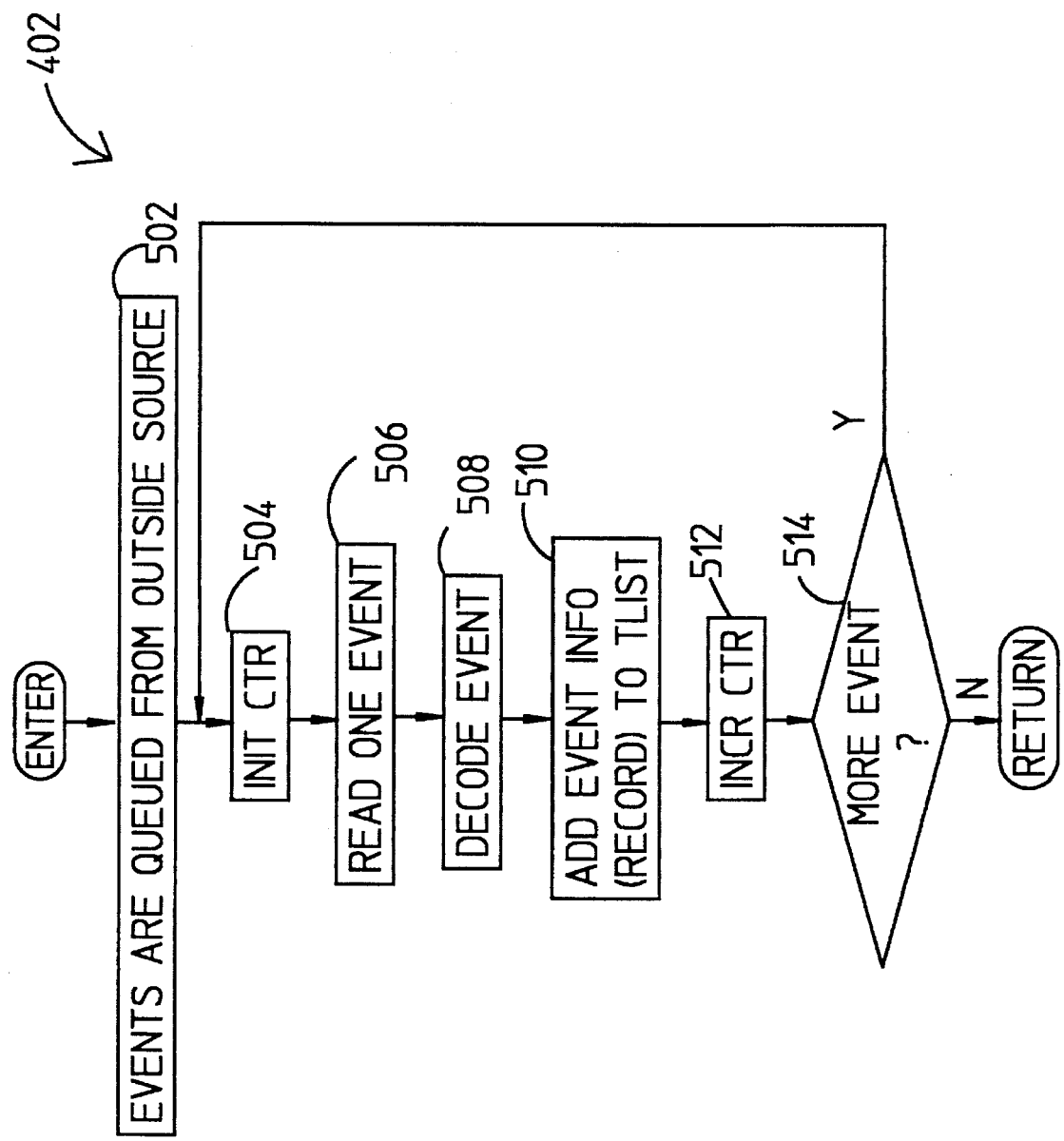
FIG. 5 is a flow chart illustrating the architecture of a read batch block of FIG. 4.

FIG. 5 shows a flow chart of the architecture and functionality for implementing a preferred embodiment of the read batch block 402 (FIG. 4). This flow chart illustrates how the translator 318 reads a batch of events from the topology manager 310. As indicated in a block 502, initially, events from the topology manager 310 which indicate changes in topology data are accumulated (queued). A counter at block 504 is used in connection with a loop in order to route each event from the topology manager 310 to the translator 318. At block 506, an event is read by the translator 318 from the manager 310. Block 506 transfers to block 508, which decodes the event. The event is decoded to identify the type of event and associated data. There are numerous types of events, and different types of events will have different types of associated data. More specifically, an event can involve, for example but not limited to, a new node or a node status change (e.g., connected/accessible or connected/unaccessible). An event has an event identifier, usually at the header, for identifying the type of event. Moreover, in the case of a new node, the event will contain an object identifier and an address. In the case of a node status change, the event will contain an object identifier, the old status, and the new status.

Block 508 transfers to block 510. At block 510, the decoded event data (i.e., a record) is added to a TLIST. At block 512, the counter is incremented so that another event is serviced. Block 512 transfers to block 514, which determines whether there are any more events to be serviced. If so, then block 514 transfers back to block 506 and the aforementioned process is repeated. If not, then block 514 returns to block 404 (FIG. 4).

Figure 6:
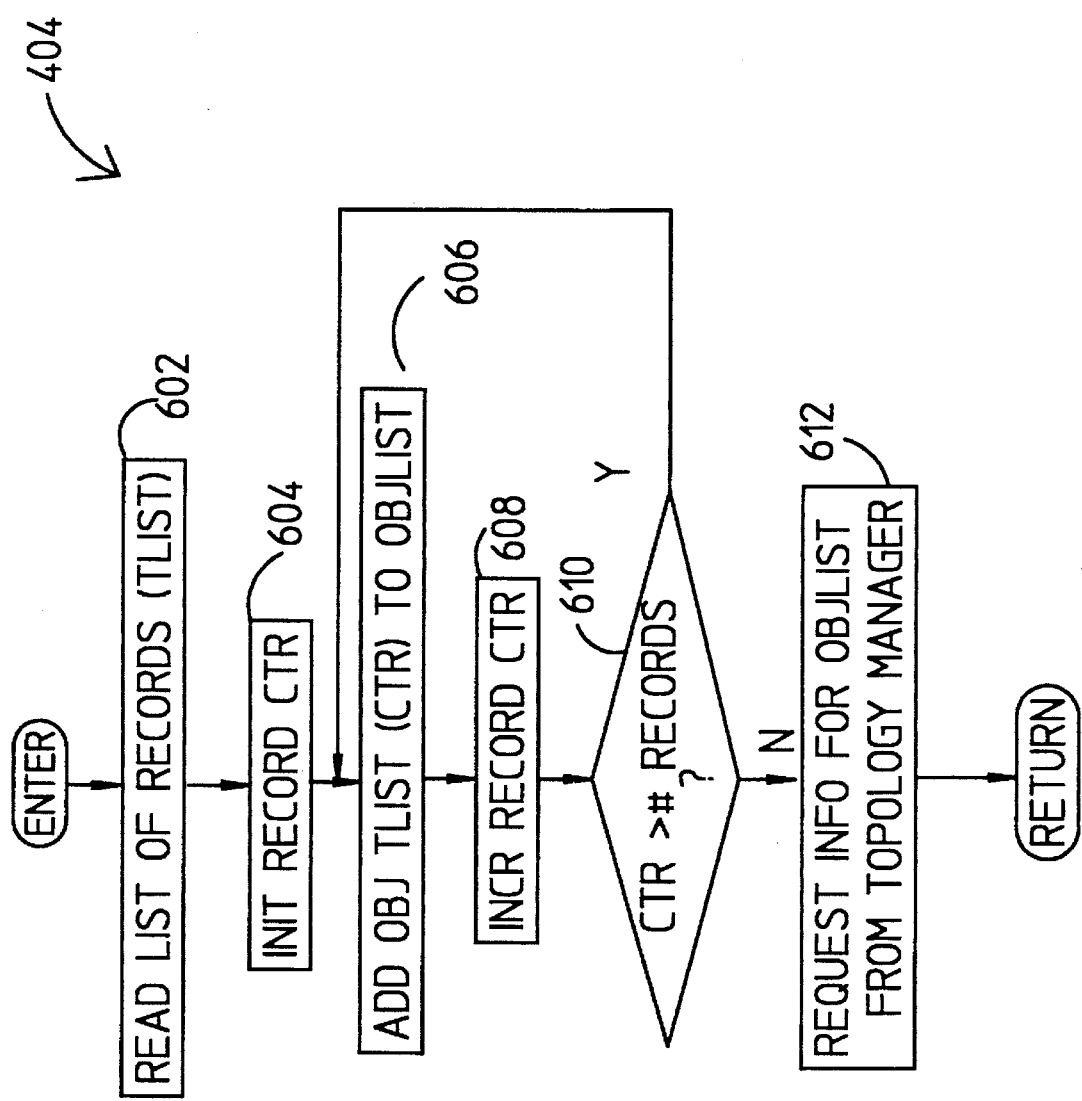
FIG. 6 is a flow chart illustrating the architecture of a retrieve objects block of FIG. 4.
Figure 7:
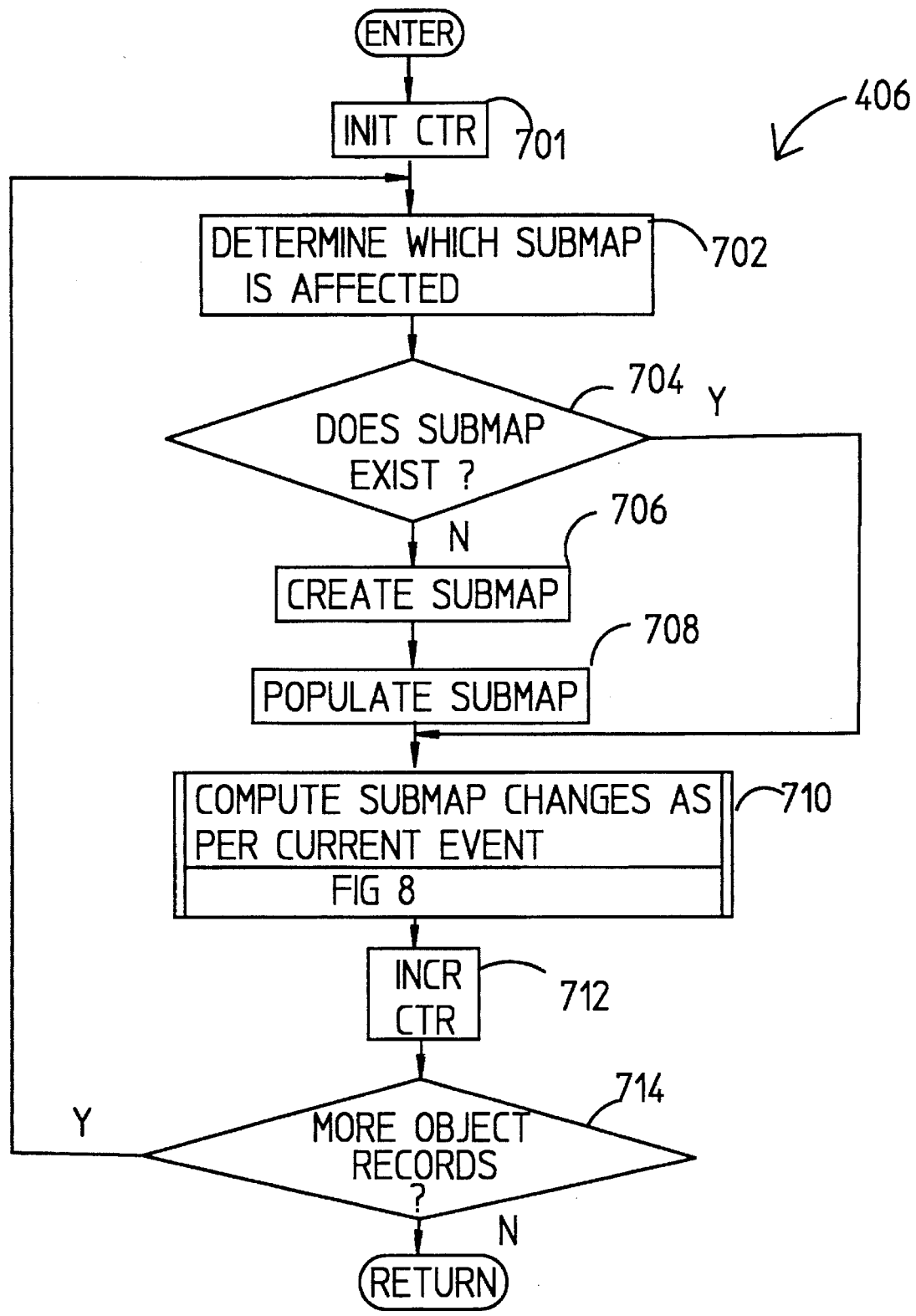
FIG. 7 is a flow chart illustrating the architecture of the compute map changes block of FIG. 4.

FIG. 6 shows a flow chart of the architecture and functionality of a preferred embodiment for implementing the retrieve object information block 404 (FIG. 4). As indicated in FIG. 6, in this flow chart, object information (OBJINFO) is decoded from the decoded event data contained in the TLIST. At block 602, the TLIST is read. Block 602 transfers to block 604, which initiates a record counter. The counter in connection with a loop causes all of the records within the TLIST to be serviced. In the loop, at block 606, a single record is read. From the record, (a) an object identifier and (b) an object change are determined. The foregoing data is placed in an object list (OBJLIST). Next, at block 608, the counter is incremented so that another record of TLIST is serviced, if any remain. Block 608 transfers to block 610. At block 610, it is determined whether there are any events left to be serviced by comparing the record count of the record counter to the total number of records already processed. If so, then block 610 transfers back to block 606, which begins to service another record. If not, then the block 610 transfers to block 612, which sends a request to the topology manager 310 for a batch transfer of object information pertaining to all of the objects within the batch. FIG. 7 shows a flow chart of the architecture and functionality of a preferred embodiment of the compute map changes block 406 (FIG. 4). In this flow chart, the translator determines which submaps (FIG. 2) are changed and the change to be effectuated, based upon the object identifiers and the object changes, which were previously determined based upon the events. With reference to FIG. 7, at block 701, a counter is initiated for object records. The counter and a loop ensure that all object changes are effectuated in the submaps. In the loop, block 702 determines a submap identifier based upon which of the submaps (FIG. 2) are affected by the object changes. Block 702 transfers to block 704, which determines whether the affected submap has been created. If the submap has been created, then the block 704 transfers to the block 710. If the submap has not yet been created, then the block 704 transfers to the block 706. At block 706, the affected submap is created in the map 200 (FIG. 2) by the translator 318. At block 708, the translator 318 populates the newly created submap with map data retrieved from the topology manager 310. Next, at block 710, submap changes based upon the current event, particularly the object identifier and the object change, are computed. These computations of block 710 will be described hereinafter relative to FIG. 8. Block 710 transfers to block 712, which increments the counter keeping track of object records (and set at block 701). Block 712 transfers to block 714. Block 714 makes an inquiry as to whether any object records remain to be serviced. If so, then block 714 transfers to block 702. If not, then the flow chart of FIG. 4 terminates. Hence, at the conclusion of the flow chart in FIG. 4, a batch of submap identifiers with associated submap changes has been generated from a batch of object identifiers with associated object changes.

Figure 8:
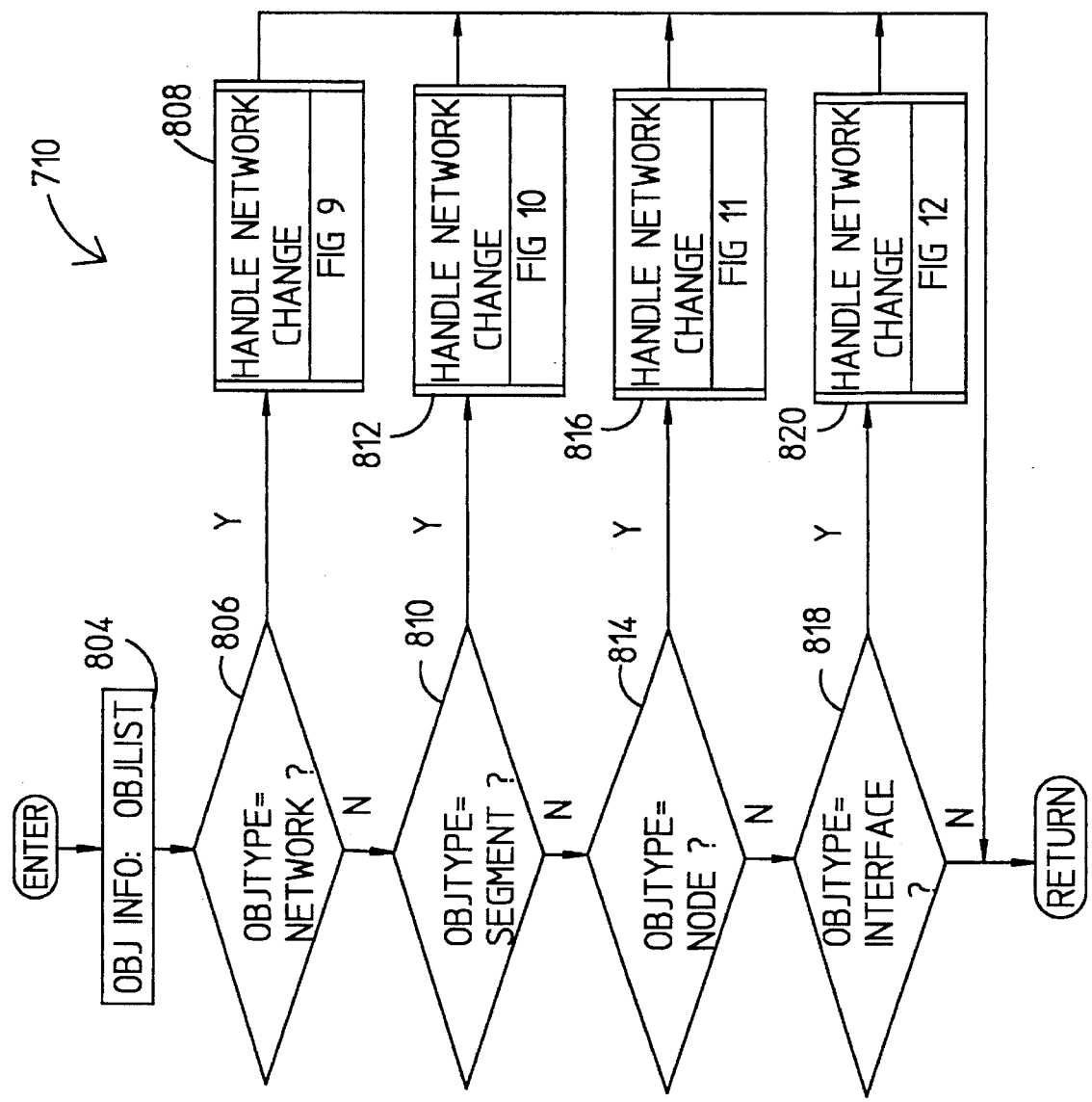
FIG. 8 is a flow chart illustrating the architecture of a compute submap changes block of FIG. 7.

With reference to FIG. 8, relative to the submap change computations of block 710 (FIG. 7), at block 804, data concerning a single object is retrieved from OBJLIST. Block 804 transfers to block 806, which determines whether the object type is a network. If so, then block 806 transfers to block 808 (flow chart in FIG. 9), which computes the submap changes. If not, then the block 806 transfers to the block 810. At block 810, a determination is made as to whether the object type is a segment. If so, then the block 810 transfers to the block 812 (flow chart of FIG. 10), which computes the segment changes to the submaps. If not, then the block 810 transfers to the block 814. At block 814, a determination is made as to whether the object type is a node. If so, then the block 814 transfers to the block 816 (flow chart of FIG. 11), which computes the node changes for the submaps. If not, then the block 814 transfers to the block 818. At block 818, a determination is made as to whether the object type is an interface. If so, then the block 818 transfers to the block 820 (flow chart of FIG. 12), which computes the interface changes to the submap.

Figure 9:
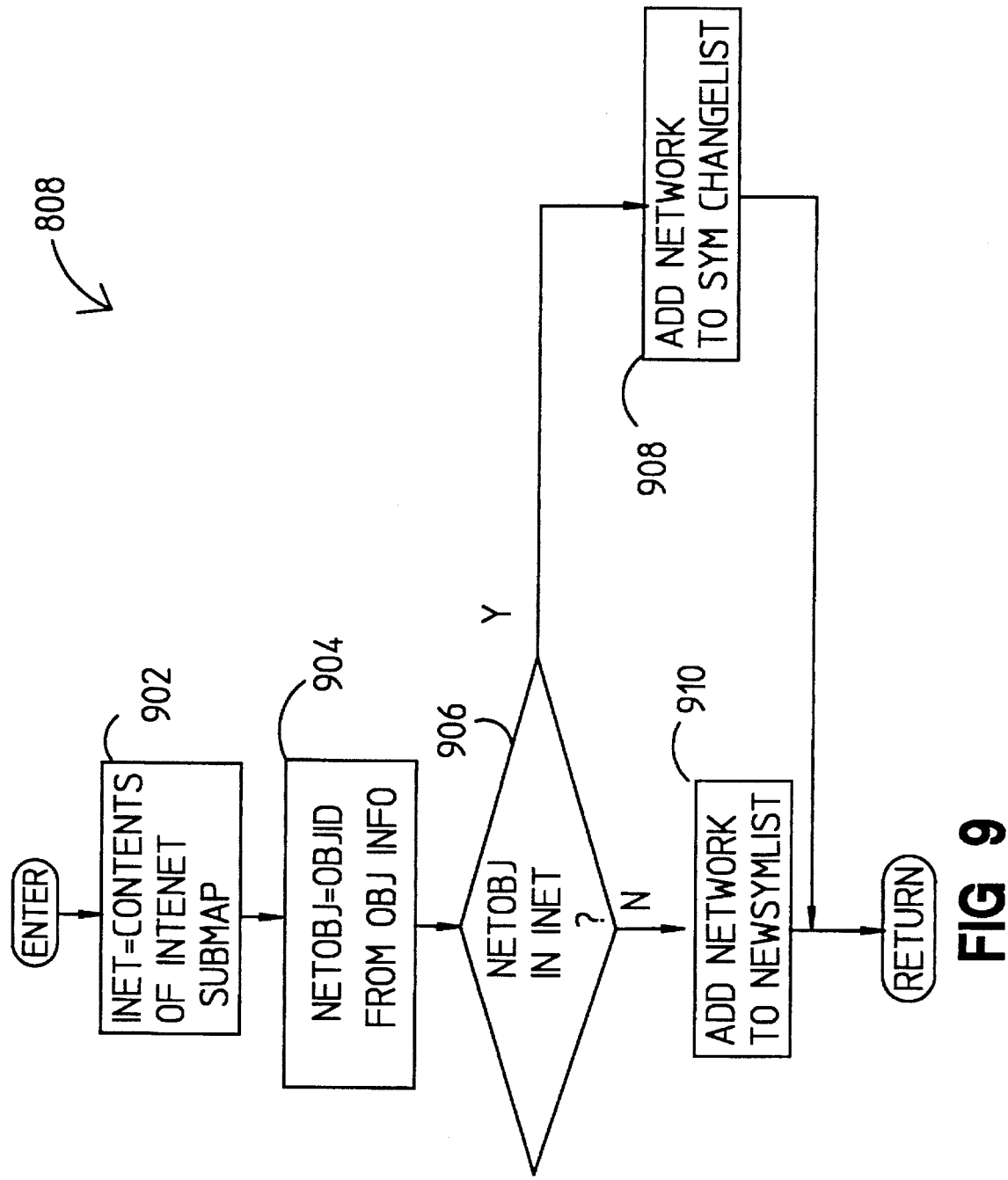
FIG. 9 is a flow chart illustrating the architecture of a network change block of FIG. 8.

FIG. 9 shows a flow chart of the architecture and functionality of a preferred embodiment for implementing the network change block 808 (FIG. 8). This flow chart computes changes to the internet submap 204 (FIG. 2), which displays the networks. Moreover, note that there is only a single submap (multiple submaps are possible) at the internet level in the preferred embodiment. With reference to FIG. 9, at block 902, a variable INET is set to assume the contents of the internet submap 204 (FIG. 2). The contents include a list of network objects and router objects and a list of connections between the network and router objects. Block 902 transfers to block 904. At block 904, a variable NETOBJ is set to assume the value of the object identifier (OBJID). The OBJID is retrieved from the OBJINFO. Block 904 transfers to block 906. At block 906, a determination is made as to whether NETOBJ is in INET, i.e., whether the object to be changed resides within the internet submap 204 (FIG. 2). If so, then the block 906 transfers to the block 908, which adds the network pertaining to the NETOBJ to a list SYMCHANGELIST. If not, then the block 906 transfers to the block 910, which adds the network pertaining to the NETOBJ to a list NEWSYMLIST. The lists SYMCHANGELIST and NEWSYMLIST are ultimately forwarded by the translator 318 to the GUI 322 during the batch transfer therebetween.

Figure 10:
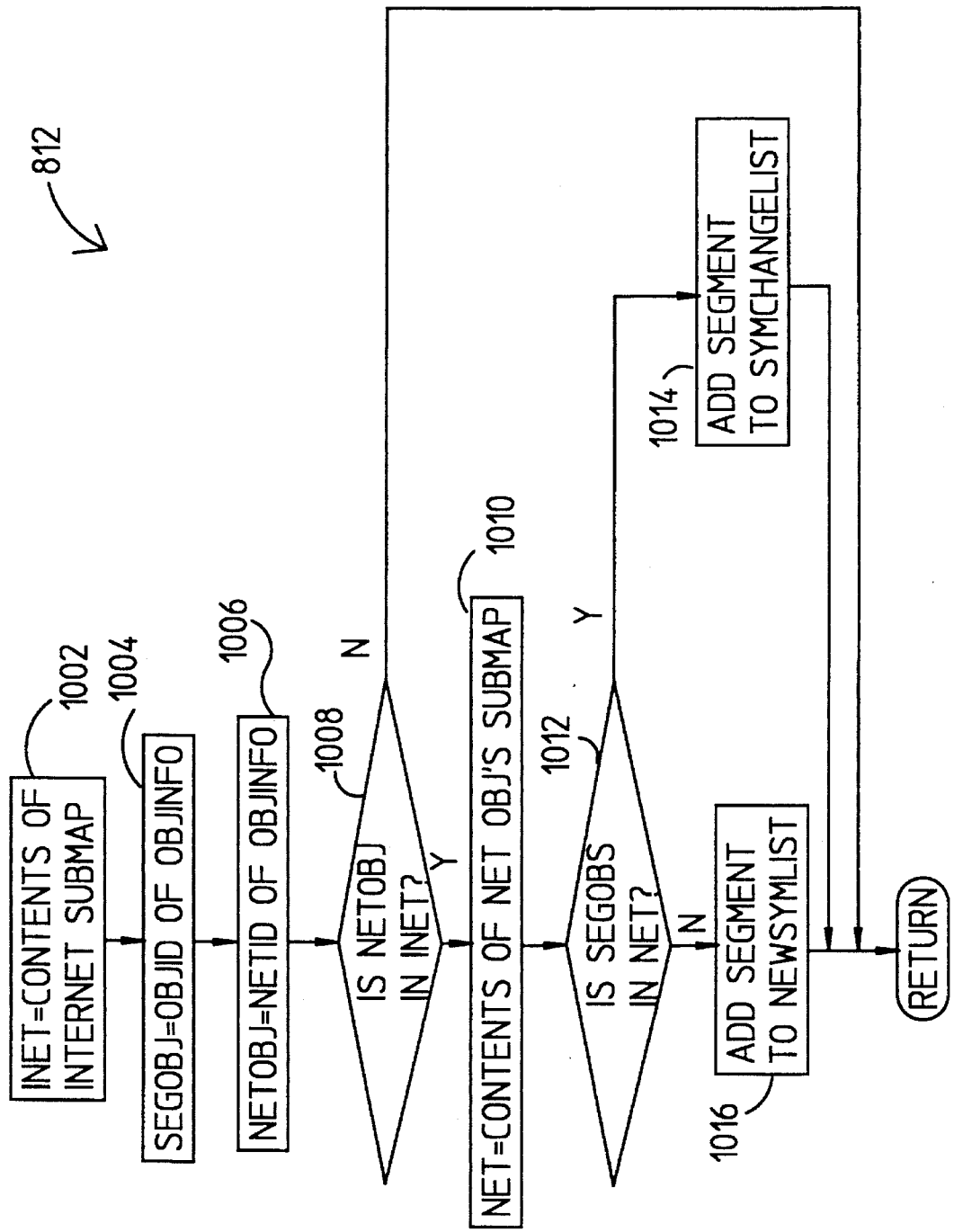
FIG. 10 is a flow chart illustrating the architecture of a segment change block of FIG. 8.

FIG. 10 shows a flow chart of the architecture and functionality of a preferred embodiment for implementing the segment change block 812 (FIG. 8). In this flow chart, segment changes are determined and computed. With reference to FIG. 10, block 1002 sets a variable INET to assume the contents of the internet submap 204 (FIG. 2). The contents include a list of network and router objects and a list of connections between the network and router objects. Block 1002 transfers to block 1004. At block 1004, a variable SEGOBJ is set to assume the current object identifier (OBJID), which is retrieved from the object information (OBJINFO). Block 1004 transfers to block 1006. At block 1006, a variable NETOBJ is set to the network identified (NETID), which is determined from the OBJINFO. Block 1006 transfers to block 1008. At block 1008, a determination is made as to whether NETOBJ is in INET, i.e., whether the current network is within the current internet submap 204 (FIG. 2). If not, then the flow chart of FIG. 10 terminates. If so, then the block 1008 transfers to block 1010. At block 1010, a variable NET is set to assume the contents of the network submap 206 (FIG. 2) pertaining to NETOBJ. The contents include, for example but not limited to, a list of segment and connector objects and connections between segment and connectors. Block 1010 transfers to block 1012. At block 1012, a determination is made as to whether SEGOBJ is in the NET (i.e., is the segment in the network submap?). If so, then the block 1012 transfers to the block 1014, which adds the segment pertaining to SEGOBJ to the SYMCHANGELIST. Otherwise, if not, block 1012 transfers to the block 1016, which adds the segment pertaining to SEGOBJ to NEWSYMLIST. Finally, after blocks 1014, 1016, the flow chart of FIG. 10 terminates and operation transfers back to FIG. 8.

Figure 11:
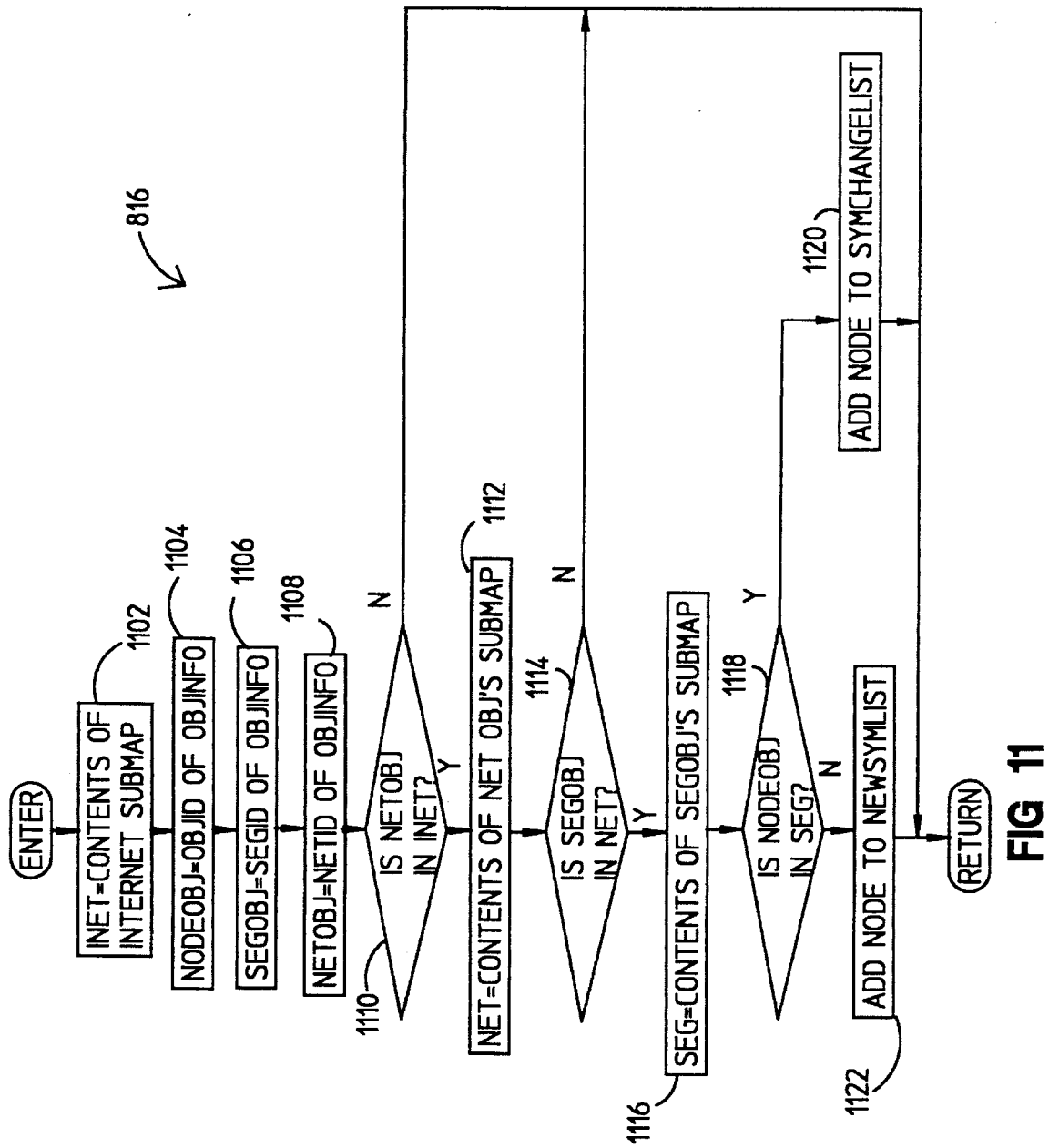
FIG. 11 is a flow chart illustrating the architecture of a node change/block of FIG. 8.

FIG. 11 shows a flow chart of the architecture and functionality of a preferred embodiment for implementing the node change block 816 (FIG. 8). In the flow chart of FIG. 11, node changes are determined and computed by the translator 318. As shown in FIG. 11, block 1102 sets a variable INET to assume the contents of the internet submap 204 (FIG. 2). The contents include a list of network and router objects and a list of connections between the network and router objects. Block 1102 transfers to block 1104. At block 1104, a variable NODEOBJ is set to assume the object identifier (OBJID) contained in the object information (OBJINFO). Block 1104 transfers to block 1106. At block 1106, a variable SEGOBJ is set to assume the segment identifier (SEGID) contained within the OBJINFO. Block 1106 transfers to block 1108. At block 1108, a variable NETOBJ is set to assume the network identifier (NETID) contained within the OBJINFO. Block 1108 transfers to block 1110. At block 1110, a determination is made as to whether NETOBJ is in INET (i.e., is the network in the internet submap?). If not, then the flow chart terminates. If so, then the block 1110 transfers to the block 1112. At block 1112, the variable NET is set to assume the contents of the network submap 206 (FIG. 2) pertaining to NETOBJ. The contents include a list of segments, connectors and connections between segments and connectors. Block 1112 transfers to block 1114. At block 1114, a determination is made as to whether SEGOBJ is in NET. If not, then the flow chart terminates. If so, then the block 1114 transfers to the block 1116. At block 1116, the variable SEG is set to assume the contents of the segment submap 208 (FIG. 2) pertaining to SEGOBJ. The contents include, for example but not limited to, a list of nodes and connections between the nodes and the network. Block 1116 transfers to block 1118. At block 1118, a determination is made as to whether NODEOBJ is in SEG, i.e., whether the node object is in the present segment at issue. If so, then the block 1118 transfers to the block 1120, which adds the node pertaining to NODEOBJ to SYMCHANGELIST and then the flow chart terminates. Otherwise, if not, the block 1118 transfers to the block 1122 which adds the node pertaining to NODEOBJ to NEWSYMLIST and then the flow chart terminates.

Figure 12A:
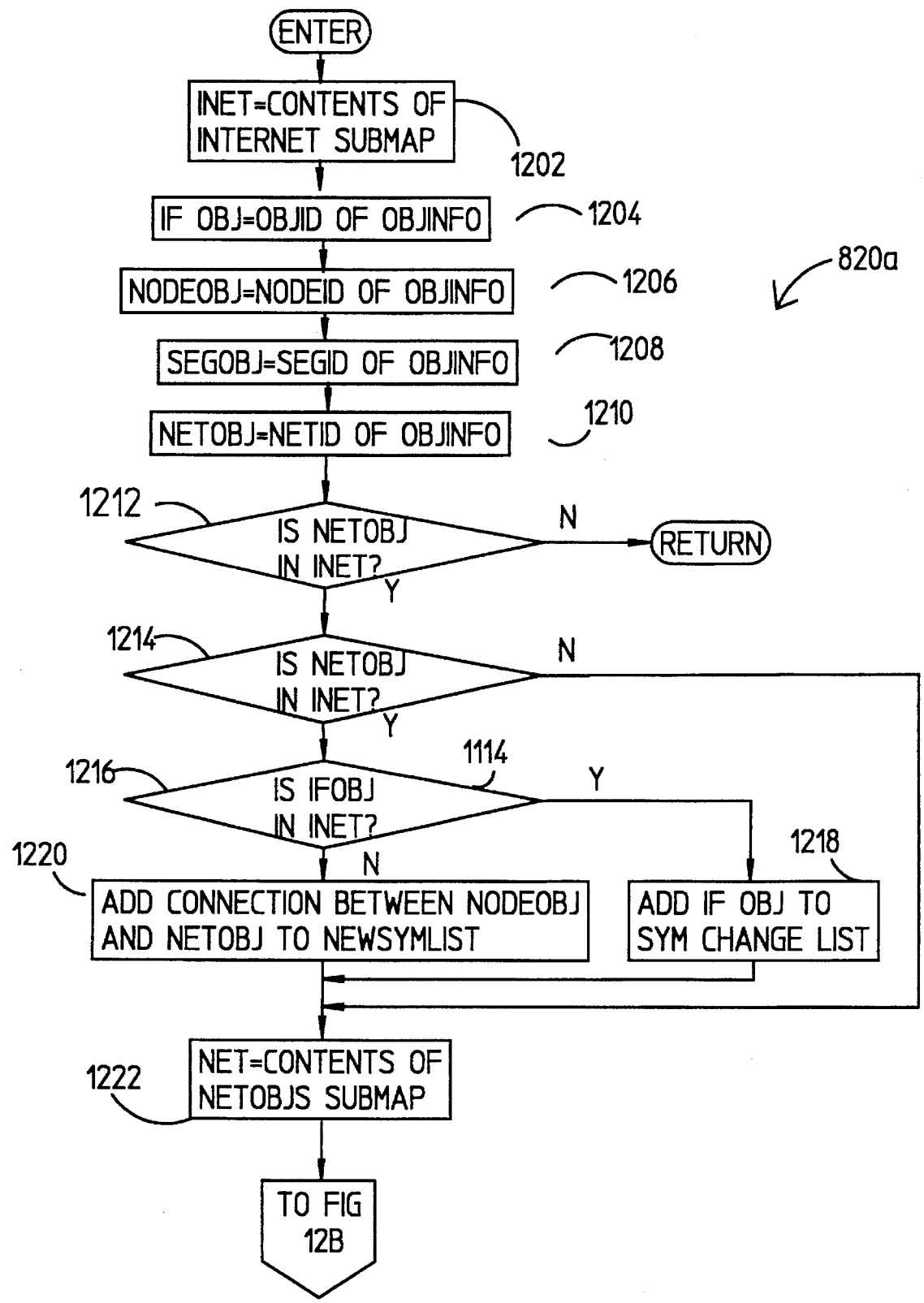
FIGS. 12A–12C are the flow charts illustrating the architecture of an interface change block of FIG. 8.
Figure 12B:
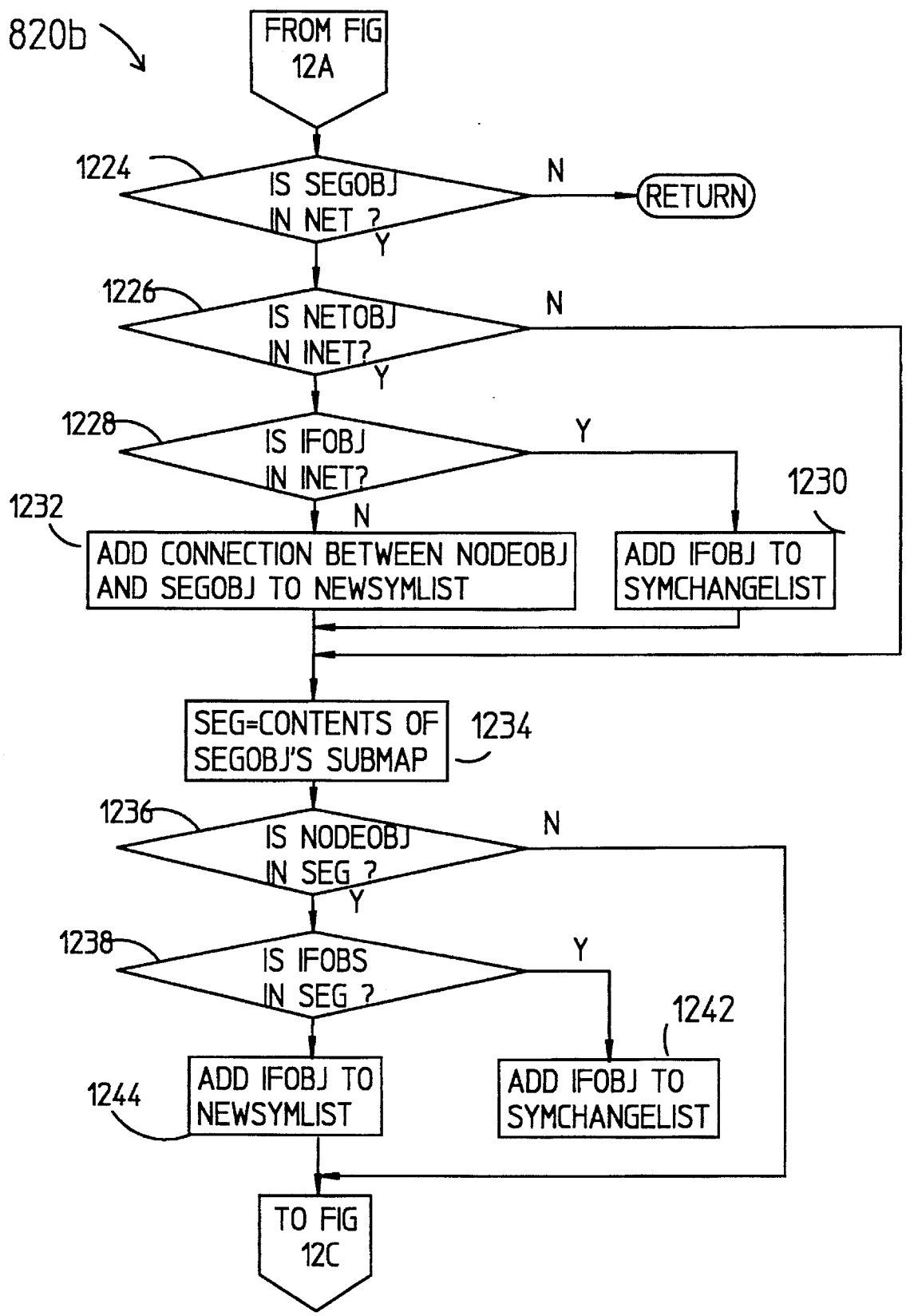
Figure 12C:
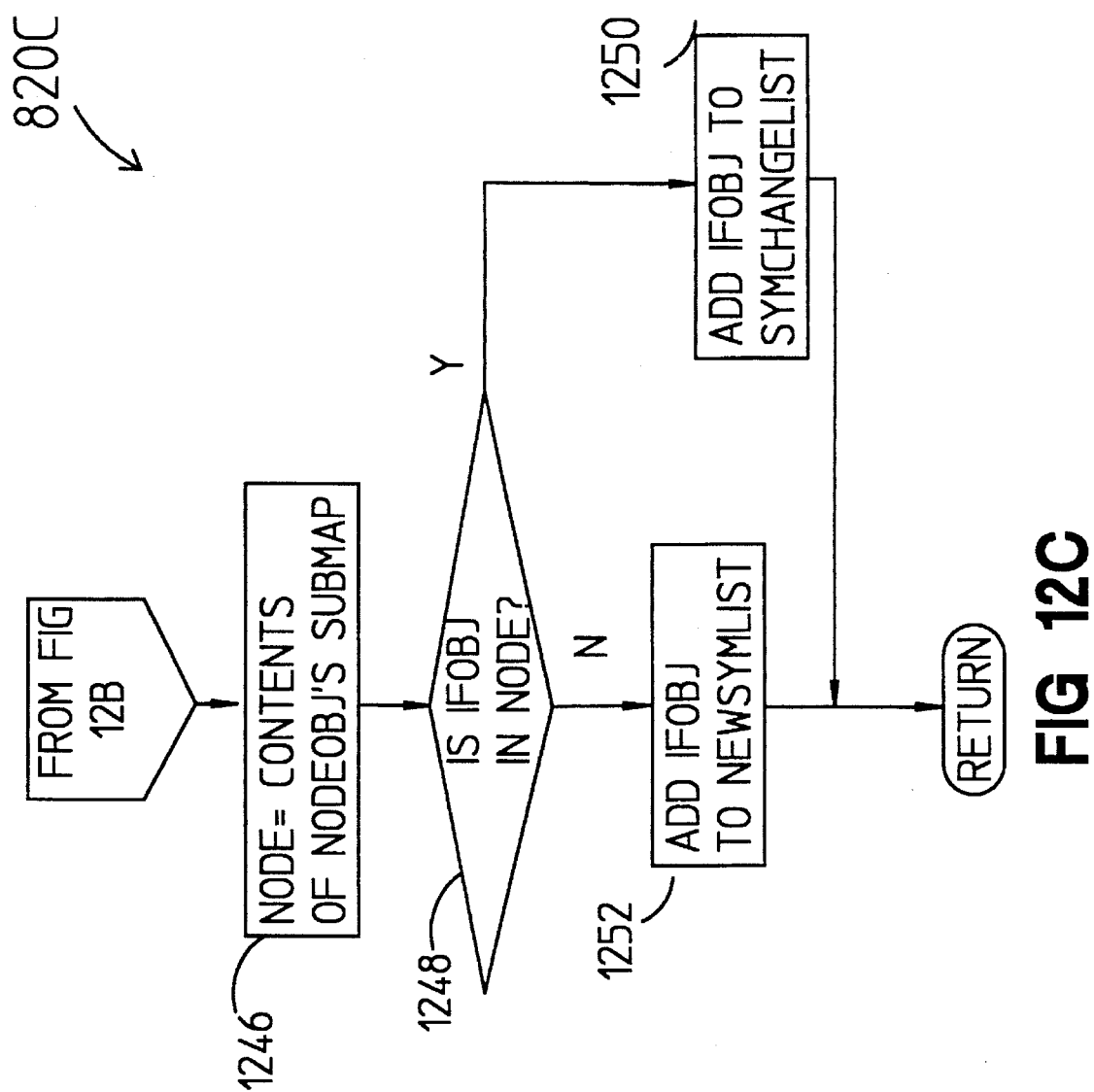

FIGS. 12A through 12C collectively show a flow chart of the architecture and functionality of the preferred embodiment for implementing the interface change block 820 (FIG. 8). In this flow chart, interface changes in the submaps are determined and computed by the translator 318 (FIG. 3). With reference to FIG. 12A, a block 1202 sets a variable INET to assume the contents of the internet submap 204 (FIG. 2) which is currently at issue. The contents include a list of networks, routers and connections objects. Block 1202 transfers to block 1204. At block 1204, a variable IFOBJ is set to assume the OBJID contained within the OBJINFO. The block 1204 transfers to the block 1206. At block 1206, the variable NODEOBJ is set to assume the NODEID contained within the OBJINFO. Block 1206 transfers to block 1208. At block 1208, the variable SEGOBJ is set to assume the SEGID contained within OBJINFO. Block 1208 transfers to block 1210. At block 1210, a variable NETOBJ is set to assume the NETID contained within OBJINFO. After block 1210, the initialization process has been completed and the block 1210 transfers to block 1212.

At block 1212, a determination is made as to whether NETOBJ is in INET, i.e., whether the network object is in the current internet submap 204 (FIG. 2). If not, the flow chart terminates, as shown in FIG. 12A. If so, then block 1212 transfers to block 1214. At block 1214, a determination is made as to whether NODEOBJ is in INET, i.e., whether the node object is in the internet submap 204 (FIG. 2). If not, then the block 1214 transfers to the block 1222. If so, then the block 1214 transfers to the block 1216.

At block 1216, a determination is made as to whether IFOBJ is in INET. If so, then the block 1216 transfers to the block 1218, which adds the interface pertaining to IFOBJ to the SYMCHANGELIST. If not, then the block 1216 transfers to block 1220, which adds the interface pertaining to IFOBJ (between node object and network object) to NEWSYMLIST.

At block 1222, the variable NET is set to assume the contents of the network submap 206 (FIG. 2). The contents include, for example but not limited to, segments, connectors, connections, etc. Block 1222 transfers to block 1224 of FIG. 12B.

At block 1224, a determination is made as to whether SEGOBJ is in NET, i.e., whether the segment object is within the network submap 206 (FIG. 2). If not, then the flow chart terminates. If so, then the block 1224 transfers to the block 1226.

At block 1226, a determination is made as to whether NODEOBJ is in NET, i.e., whether the node object is within the network submap 206 (FIG. 2). If not, then the flow chart transfers to block 1234. If so, then the block 1226 transfers to block 1228.

At block 1228, a determination is made as to whether IFOBJ is within NET, i.e., whether the interface object is within the network submap 206 (FIG. 2). If so, then the block 1228 transfers to the block 1230, which adds the interface pertaining to IFOBJ to SYMCHANGELIST. If not, then the block 1228 transfers to the block 1232, which adds the interface pertaining to IFOBJ (which is between a node object and a segment object) to NEWSYMLIST. The blocks 1230, 1232 transfer to the block 1234.

At block 1234, the variable SEG is set to assume the contents of the segment submap 208 (FIG. 2). The contents include, for example, but not limited to, nodes and connections to network (interfaces). Block 1234 transfers to block 1236.

At block 1236, a determination is made as to whether NODEOBJ is in SEG, i.e., whether the node object is within the segment submap 208 (FIG. 2). If not, then the flow chart transfers to the block 1246 of FIG. 12B. If so, then the block 1236 transfers to the block 1238.

At block 1238, a determination is made as to whether IFOBJ is within SEG, i.e., whether the interface object is within the segment submap 208 (FIG. 2). If so, then the block 1238 transfers to the block 1242, which adds the interface pertaining to IFOBJ to SYMCHANGELIST. If not, then the block 1238 transfers to the block 1244, which adds the interface pertaining to IFOBJ to NEWSYMLIST. The blocks 1242, 1244 transfer to the block 1246 of FIG. 12C.

At block 1246, the variable NODE is set to assume the contents of the node submap 210 (FIG. 2). The contents include interface objects. Block 1246 transfers to block 1248.

At block 1248, a determination is made as to whether IFOBJ is within NODE, i.e., whether the interface object is within the node submap 210 (FIG. 2). If so, then the interface pertaining to IFOBJ is added to SYMCHANGELIST, as indicated at block 1250. If not, then the block 1248 transfers to the block 1252, which adds the interface pertaining to IFOBJ to NEWSYMLIST. Finally, after blocks 1250, 1252, the flow chart contained collectively in FIGS. 12A through 12C terminates.

FIG. 13 shows a flow chart of the architecture and functionality of a preferred embodiment for implementing the update map block 408 (FIG. 4). In this flow chart, a batch transfer of changes is sent by the translator 318 to the GUI 322. With reference to FIG. 13, at block 1302, the translator 318 transfers the NEWSYMLIST to the GUI 322, and in block 1304, the translator 318 transfers the SYMCHANGELIST to the GUI 322. After block 1304, the flow chart of FIG. 13 terminates and the operation passes back to block 410 (FIG. 4).

FIG. 14 illustrates an on-demand submap module contained within the GUI 322 (FIG. 3). This flow chart implements the user interface to the various submaps of the map 200 (FIG. 2). With reference to FIG. 14, at a block 1402, the GUI 322 monitors the input devices connected to the management station 100 (FIG. 1), for instance, the keyboard 106. When the user of the management station 100 prompts the management station 100 via the keyboard 106 or via some other input device to explode an object on the display 108, the block 1402 of FIG. 14 transfers to the block 1404 in order to process the user request. At block 1404, a determination is made as to whether the child submap is contained within the map 200 (FIG. 2). If so, then the block 1404 transfers to the block 1408. If not, then the block 1404 transfers to the block 1406, which creates and populates the submap. The GUI 322 populates the submap by requesting the translator 318 to create and populate a submap based on topology data retrieved from topology manager 310. Moreover, block 1406 transfers to block 1408 which opens the child submap and displays the child submap on the display 108 for the user.

It will be obvious to those skilled in the art that many modifications can be made to the preferred embodiment as described above without departing from the spirit and scope of the present invention. The disclosures and description are intended to be illustrative and any such modifications are intended to be included herein within the scope of the present invention, as is defined in the following claims.

Wherefore, the following is claimed:

1. A batch transfer system for enhancing the speed at which map data for a display is generated from topology data pertaining to a network, comprising:

(a) a processor;

(b) a discovery mechanism associated with said processor, said discovery mechanism configured to generate and store topology data indicative of devices and interconnections of said network, said discovery mechanism configured to generate topology change events when a change in network topology occurs;

(c) a layout mechanism associated with said processor and in communication with said discovery mechanism, said layout mechanism configured to receive said topology data and said events from said discovery mechanism, said layout mechanism configured to drive said display based upon said topology data, said layout mechanism comprising:

(1) a translator configured to convert said topology data to said map data, said translator configured to receive said events and configured to change said map data based upon said events; and (2) a graphical user interface configured to receive said map data from said translator and to drive said display based upon said map data; and (d) wherein said translator is configured to access said processor periodically and wherein said translator accumulates said events between accesses and services a plurality of said events during a single access to said processor so that said map data is modified based upon said events and the speed for generating map data is increased by minimizing the number of said accesses of said translator to said processor.

2. The system of claim 1, wherein said translator and said graphical user interface are configured to periodically exchange display map changes and wherein said translator accumulates said display map changes between periodic exchanges and forwards a plurality of said display map changes to said graphical user interface during a single exchange therebetween so that said exchanges are minimized and the speed for generating map data is increased.

3. The system of claim 1, wherein said translator further comprises:

a means for determining object changes based upon said events; and a means for determining said map changes based upon said object changes.

4. The system of claim 1, wherein said translator is configured to generate a plurality of submaps from said topology data, and said graphical user interface is configured to drive any of said submaps to said display based upon an input from a user.

5. The system of claim 4, wherein said translator further comprises a means for determining which of said submaps have changed based upon said events.

6. The system of claim 4, wherein said submaps include an internet submap having at least one network object, at least one network submap associated with said at least one network object and having at least one segment object, at least one segment submap associated with said at least one segment object and having at least one node object, and at least one node submap associated with said at least one node object and having at least one interface object.

7. A batch transfer system for enhancing the speed at which map data for a display is generated from topology data pertaining to a network, comprising:

(a) a processor;

(b) a discovery mechanism associated with said processor, said discovery mechanism configured to generate and store topology data indicative of devices and interconnections of said network, said discovery mechanism configured to generate topology change events when a change in network topology occurs;

(c) a layout mechanism associated with said processor and in communication with said discovery mechanism, said layout mechanism configured to receive said topology data and said events from said discovery mechanism, said layout mechanism configured to drive said display based upon said topology data, said layout mechanism comprising:

(1) a translator configured to convert said topology data to said map data, said translator configured to receive said events and configured to change said map data based upon said events; and (2) a graphical user interface configured to receive said map data from said translator and to drive said display based upon said map data; and (d) wherein said translator and said graphical user interface are configured to periodically exchange display map changes and wherein said translator accumulates said display map changes between periodic exchanges and forwards a plurality of said display map changes to said graphical user interface during a single exchange therebetween so that said exchanges are minimized and the speed for generating map data is increased.

8. The system of claim 7, wherein said translator further comprises:

a means for determining object changes based upon said events; and a means for determining said map changes based upon said object changes.

9. The system of claim 7, wherein said translator is configured to generate a plurality of submaps from said topology data, and said graphical user interface is configured to drive any of said submaps to said display based upon an input from a user.

10. The system of claim 9, wherein said translator further comprises a means for determining which of said submaps have changed based upon said events.

11. The system of claim 9, wherein said submaps include an internet submap having at least one network object, at least one network submap associated with said at least one network object and having at least one segment object, at least one segment submap associated with said at least one segment object and having at least one node object, and at least one node submap associated with said at least one node object and having at least one interface object.

12. The system of claim 7, wherein said translator is configured to access said processor periodically and wherein said translator accumulates said events between accesses and services a plurality of said events during a single access to said processor so that said map data is modified based upon said events and the speed for generating map data is increased by minimizing the number of said accesses of said translator to said processor.

13. A batch transfer method for enhancing the speed at which map data for a display is generated by a processor from topology data pertaining to a network, comprising the steps of:

generating and storing topology data indicative of devices and interconnections of said network;

generating topology change events when a change in network topology occurs;

converting said topology data to said map data;

using said processor periodically to affect changes to said map data based upon said events;

accumulating said events between usages of said processor; and servicing a plurality of said events during a single access to said processor so that the speed for generating map data is increased by minimizing the number of said accesses to said processor.

14. The method of claim 13, further comprising the steps of:

determining object changes based upon said events; and determining said map changes based upon said object changes.

15. The method of claim 13, further comprising the steps of generating a plurality of submaps from said topology data.

16. The method of claim 15, further comprising the step of determining which of said submaps is changed based upon said events.

17. The method of claim 15, wherein said submaps include an internet submap having at least one network object, at least one network submap associated with said at least one network object and having at least one segment object, at least one segment submap associated with said at least one segment object and having at least one node object, and at least one node submap associated with said at least one node object and having at least one interface object.

18. The method of claim 13, further comprising the steps of:

driving said display with a graphical user interface:

periodically communicating display map changes to said graphical user interface;

accumulating said display map changes between communications; and communicating a plurality of said display map changes to said graphical user interface during a single communication to said graphical user interface so that said communications are minimized and the speed for generating map data is increased.

19. A batch transfer method for enhancing the speed at which map data pertaining to a topology of a network is driven by a graphical user interface to a display, comprising the steps of:

generating and storing topology data indicative of devices and interconnections of said network;

generating topology change events when a change in network topology occurs;

converting said topology data to said map data;

periodically communicating display map changes based upon said events to said graphical user interface;

accumulating said display map changes between communications; and communicating a plurality of said display map changes to said graphical user interface during a single communication to said graphical user interface so that said communications are minimized and the speed for effectuating map data changes is increased.

20. The method of claim 19, further comprising the steps of:

determining object changes based upon said events; and determining said map changes based upon said object changes.

* * * * *